INVENTORS
PAUL M. BROWN
NOLAN D. HOPPER
RICHARD S. KAMPF
WALTER V. LORD

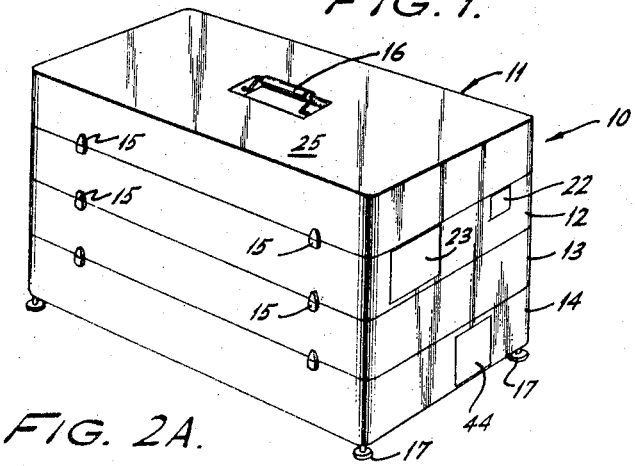

BY
Harry W. Hargis III
AGENT

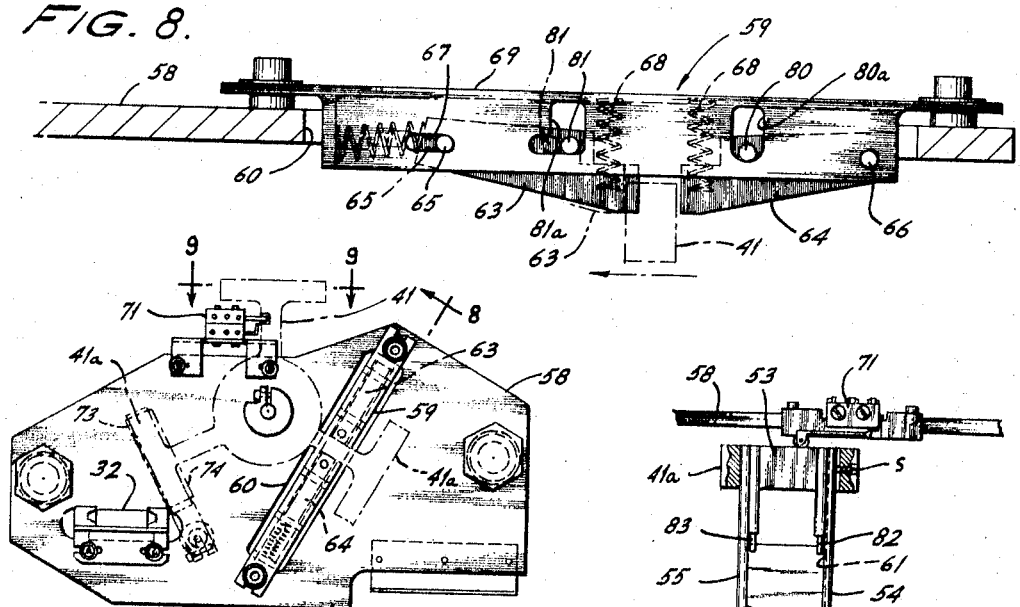
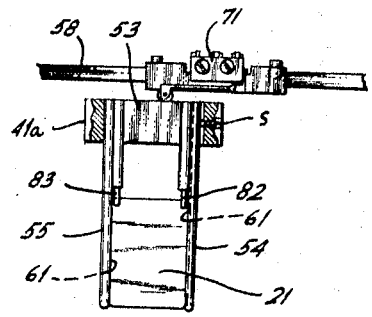
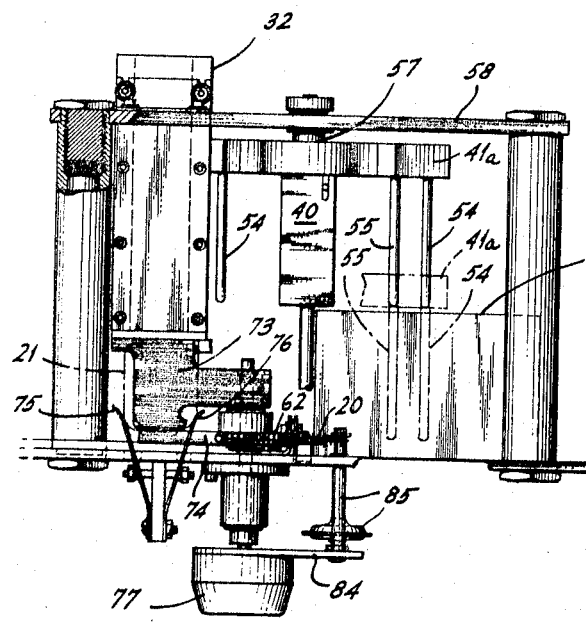
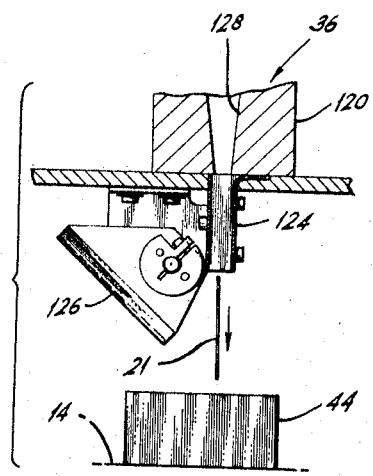
FIG. 8.
FIG. 7.
FIG. 9.
FIG. 10.
FIG. 6.
INVENTORS
PAUL M. BROWN
NOLAN D. HOPPER
RICHARD S. KAMPF
WALTER V. LORD
BY Harry W. Hargis III
AGENT United States Patent Office 3,446,134
Patented May 27, 1969

3,446,134
FILM DEVELOPING APPARATUS
Paul M. Brown, Irvine, Nolan D. Hopper, Tustin, Richard S. Kampf, Costa Mesa, and Walter V. Lord, Newport Beach, Calif., assignors to Philco-Ford Corporation, Philadelphia, Pa., a corporation of Delaware
Filed July 21, 1966, Ser. No. 566,941
Int. Cl. G03d 3/10
U.S. Cl. 95—89                                   11 Claims

ABSTRACT OF THE DISCLOSURE

Self contained, portable apparatus for automatically developing exposed dental X-ray film. The apparatus comprises four basic sections contained in a like number of separate cases arranged to stack one upon the other. These basic sections comprises an apparatus control, a film packet loader and stripper, a film processor, and a sump. The apparatus is automatically operable to accept a number of exposed film packets, to strip the film from the packets, to chemically process and dry each film sequentially, and to present the developed film at an output station for removal by an operator of the apparatus.

---

The invention herein described was made in the course of or under a contract or subcontract thereunder with the Department of the Army.

This invention relates to film developing apparatus, and more particularly to apparatus for automatically developing exposed films. While of broader applicability, the invention has particular utility in the developing of dental X-ray films.

It is a general objective of the invention to provide apparatus of the aforementioned type that is self contained and characterized by a high degree of portabliity.

For these purposes the invention comprises apparatus automatically operable to accept a number of exposed films, to chemically process and dry each film sequentially, and present the developed films at an output station for removal by an operator of the apparatus.

A preferred embodiment of the invention comprises four basic sections contained in like number of separate cases arranged to stack upon one another to form a complete apparatus. The basic sections comprise an apparatus control section, a film packet loading and stripping section, a film processing section, and a sump section.

For a more complete understanding of the invention, reference is made to the following detailed description of a preferred embodiment, taken in light of the accompanying drawing, in which:

FIGURE 1 is a perspective showing, on a somewhat reduced scale, of apparatus embodying the invention;

FIGURE 2 is an elevational showing of one end of the apparatus seen in FIGURE 1, and illustrating an operational feature of the apparatus;

FIGURE 2A is a showing of a film packet of a type the apparatus is adapted to handle;

FIGURE 5 is a perspective view of apparatus seen in FIGURES 3 and 4, with parts removed and with parts exploded, and showing additional features of the invention;

FIGURE 6 is an elevational illustration of the apparatus of FIGURE 3, as seen when looking in the direction of arrows 6—6 applied thereto;

FIGURE 7 is a plan view similar to portions of FIGURE 4, and showing further details of apparatus either omitted from or only partially illustrated in FIGURE 4;

FIGURE 8 is a sectional-elevational view looking in the direction of arrows 8—8 applied to FIGURE 7;

FIGURE 9 illustrates a portion of the apparatus seen in FIGURE 7, looking in the direction of arrows 9—9;

FIGURE 10 is a view of apparatus seen in FIGURE 5, and looking in the direction of arrows 10—10; and FIGURE 11 is a sectional view of apparatus illustrated in FIGURE 5, and taken generally along the line indicated by arrows 11—11 applied to said figure.

The control section

Figure 4:
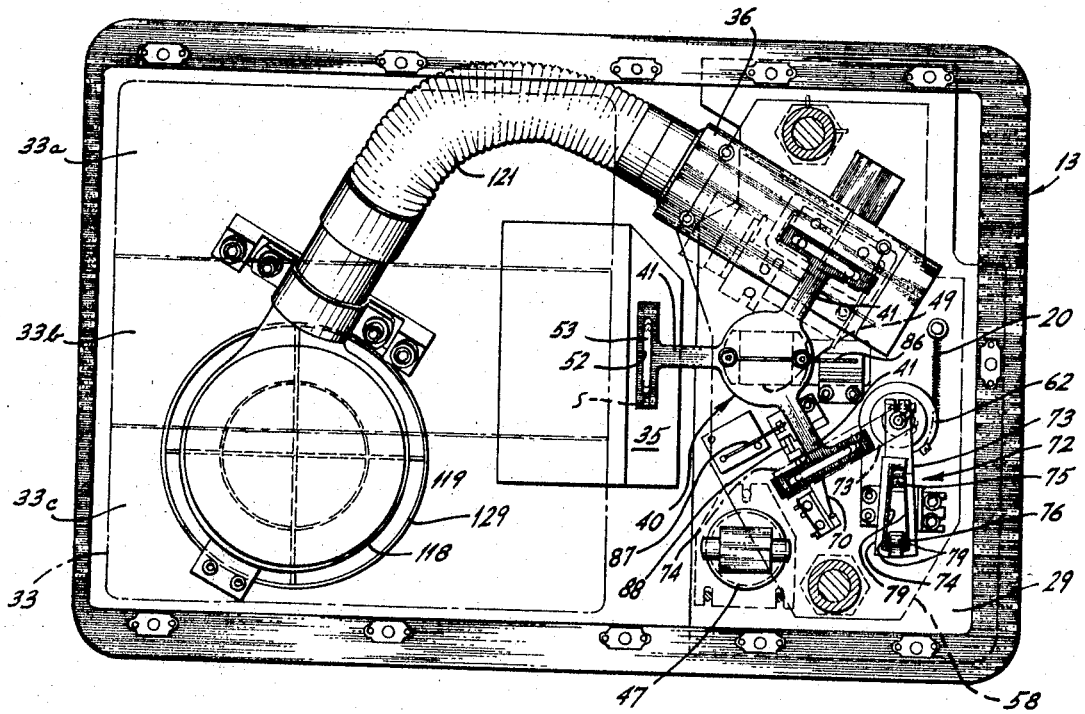
FIGURE 4 is a view of apparatus seen in FIGURE 2, on a larger scale, taken in the plane indicated by line 4—4, and looking in the direction of arrows applied thereto.

With more detailed reference to the drawing, and first to FIGURES 1 and 2, apparatus 10 embodying the invention comprises a control section 11 having a recessed cover 25 hinged at 26 to a section 12 the function of which will be described more fully below. A main control panel 27 is hinged at 28 to cover 25 and is movable from a stored position within the cover to the in-use position shown in FIGURE 2. In addition to control panel 27, section 11 includes control means, such for example as relays, logic controls, and power supplies. Elements comprising the control means will be discussed briefly but will not be shown, inasmuch as individual showing of such control means is not necessary for an understanding of the present invention. The sequence of operation of apparatus 10 may be controlled automatically by means of a program timing device of well known type comprising a cam shaft, a number of cam actuated switches, and a synchronous motor for driving the cam shaft to operate the switches. As will be fully appreciated as the description proceeds, an additional adjustable timer may be provided to control the time that the film is immersed in developing fluid. This second timer affords selective control of the developing times for different films.

The control means may comprise the following additional known items: a voltmeter and a rheostat for controlling energy supplied the air heater in the film drying system hereinafter to be more fully described; a subtracting type electric counter for indicating the quantity of film chips that may be processed with chemicals remaining in tanks provided for their storage, a "ready light" for indicating that the chemicals have reached their operating temperatures and that film processing may be initiated; and priming switch means operable to provide for introduction of chemicals into the developing chamber prior to inserting a film.

The loading and stripping section

Figure 3:
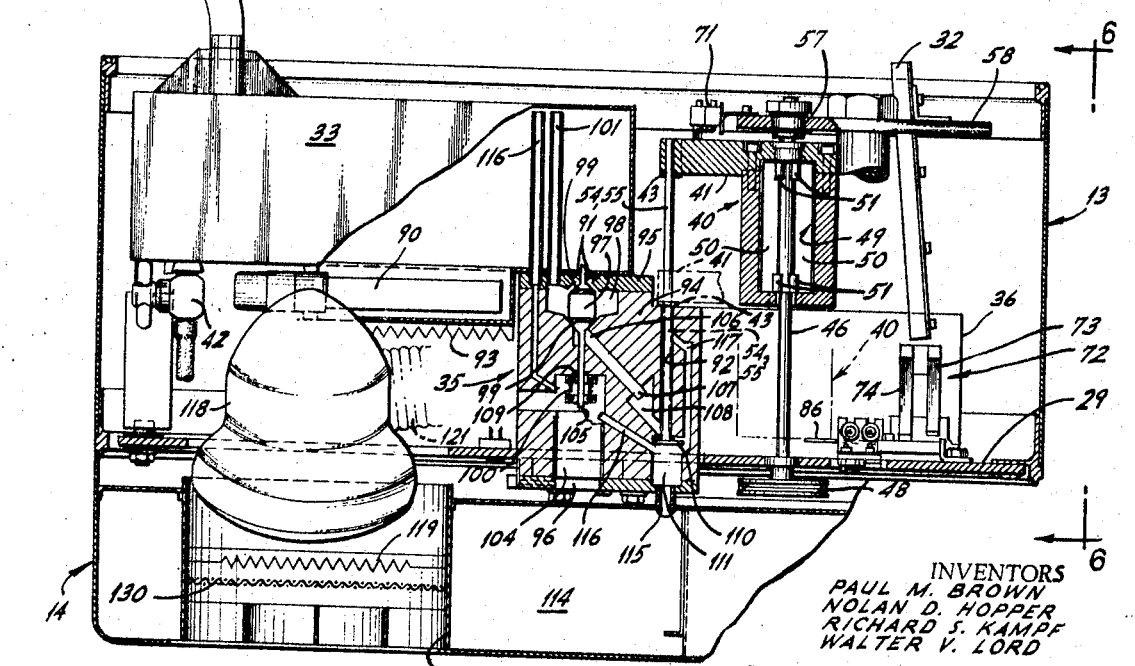
FIGURE 3 is a sectional view on a larger scale, with parts removed or broken away, taken generally along the line indicated by arrows 3—3 applied to FIGURE 2.

The film packet loading and stripping section 12 is disposed subjacent control section 11, and includes a door 22 that affords access to means operable to accept a number of film packets 18, to unwrap each packet, and to feed, on demand, each film chip 21 removed from a packet to a chute 32 (FIGURES 3, 6, and 7) leading to lower film processing section 13. A recessed region (not shown) is provided in a left hand portion of section 12, as viewed in FIGURE 1, to accommodate filling tubes 34, one of which is illustrated in FIGURE 3, and which extend upwardly from chemical tank means 33 disposed in the processing section 13. While access door 22 provides for inserting film packets 18, another access door 23 provides for removing packet wrappings. A number of devices for receiving and unwrapping film packets is known in the art and no description thereof will be undertaken. If desired, the packets may be unwrapped manually, and the film loaded directly into chute 32 through access door 23.

The processing section

With reference especially to FIGURES 3 to 6, there is disposed in the processing section 13 a film handling assembly comprising, basically, a pick-up station (chute 32 with mechanism 72), a processing station (chamber 35), a drying station (chamber 36), and "tree" structure 40 which carries film chips 21 between the aforementioned stations.

As seen in FIGURES 3, 4, and 5, and first briefly described, processing section 13 includes chamber 35 within which each film chip 21 is chemically processed as it is received from loading and stripping section 12. Section 13 also includes means 36 for drying each chip, and means for feeding each chip into a removable container 44 (FIGURE 10) located in the sump section 14 disposed below the processing section. Tanks 33 supply chemicals to processing chamber 35 where film chips 21 are immersed in the chemicals, a valve system meters the chemicals into the chamber 35, and the films are dried in chamber 36. Additionally, section 13 includes means 40—described in detail later—for tranporting the films from one of the aforesaid stations to another.

The sump section

Sump section 14 includes a tank 114 for receiving, gravitationally, used chemicals from processing section 13, means for draining tank 114, removable container 44 (FIGURE 5) for holding processed film chips 21, and means to be more fully described defining air inlet and outlet openings for the film chip drying means 36.

Detailed description of the processing section

The processing section 13 comprises, essentially, a pair of major sub assemblies including the above-described elements grouped into a film transport sub-assembly supported by spaced plates 29 and 58, (FIGURES 5 and 7) and a tank and chamber subassembly. These subassemblies are of essentially modular construction, whereby fabrication and servicing of the apparatus is enhanced, and elements thereof will now be described in detail.

The pick-up station

Each film chip 21 is introduced into the processing section by its insertion into the top of chute 32, either by previously described mechanism in the stripper-loader section 12, or by hand. The film drops down chute 32 (FIGURES 3, 6, and 7) into pick-up station 72 where it is engaged by adjustable leaf springs 75 and 76 (FIGURES 4 and 6) and is positioned between pivotal arms 73 and 74. The film chip is clamped by arms 73, 74, and is rotated thereby into position (broken line showings, FIGURES 4 and 7) under a film holding portion 41a that is carried by, and perpendicular to arm 41 of tree 40 which will be described later in more detail. Rotation of pivotal arms 73 and 74 is accomplished by means of rotary solenoid 77 (FIGURES 5 and 6). Shaft 78 of solenoid 77 rotates arm 73 clockwise so as to clamp a film chip against arm 74 which is pivotally mounted on bearings on solenoid shaft 78. Arms 73 and 74 include soft pads 79, such for example as felt pads, on their confronting surfaces which contact the film 21. Spring 20 urges arm 74, which is free to rotate on solenoid shaft 78, into clamping engagement with the film chip 21 as it is rotated by arm 73 into position under tree arm portion 41a (see broken line showings, FIGURES 4 and 7). Spring 20 is anchored at one end to base 29 and at its other end to a pulley 62 keyed to shaft 78. The construction and arrangement is such that the spring lies in the groove of the pulley as it turns with shaft 78. For convenience, a portion of pulley 62 has been broken away in FIGURE 5, and there remains a portion of the pulley in the region of the spring attachment.

Pick-up of film 21 by the tree arm portion 41a is effected when the tree is lowered while arms 73, 74 are positioned as shown in broken lines FIGURES 4 and 7. As best seen in FIGURE 9, each of parallel guide rods 54 and 55, which extend down from each arm portion 41a of the tree, includes confronting lateral groove 61 arranged to slip over opposite, vertically extending edges of the film 21 and guide film into clamping engagement by spring clips 82 and 83. Spring clips 82 and 83 prevent film 21 from falling from between the rods as the tree is raised. Conveniently, rods 54 and 55 are held in place by disposition thereof in the ends of slots 52 provided in arm portions 41a. Spacers 53 and the spring clips are positioned in the slots between the rods, and set screws S clamp the rods, the clips, and the spacers in place.

Clamping force exerted by arms 73 and 74 on the film 21 is released as soon as tree 40 reaches its lower, film pick-up positions and operably engages limit switch 86 (FIGURE 3). This deenergizes drive motor 47 and solenoid 77, allowing arm 73 to swing back to its rest position. Arm 74 is held in position under the tree arm portion 41a by guide rods 54 and 55 until tree 40 is raised and the rods move clear of the upper edge of arm 74, spring 20 then returning arm 74 to it rest position. Mechanical stops are provided at the pivoted and at the rest positions of arms 73 and 74 to establish limits of travel of these arms.

A torque arm 84 attached to the body of rotary solenoid 77 is positioned and operable to engage shock mount 85. Torque arm 84 prevents rotation of the solenoid body, and the shock mount 85 absorbs the motions of the solenoid body as it operates, and attenuates forces developed as arms 73 and 74 strike their mechanical stops. Limit switch 70 (FIGURE 4) is operable by arms 73 and 74 when they are in position under the tree, and serves as a signal for tree 40 to be moved downwardly.

The apparatus includes means (switch 87, FIGURE 4) for sensing whether or not a film 21 is in position in the pick-up station, so that the next time tree 40 moves downwardly the control system will be signalled whether or not to introduce chemicals into processing chamber 35. If a film is in position, it engages an actuator rod 88 for switch 87 to force the rod into a position in which it operates the switch as arms 73 and 74 pivot film 21 into position. Switch 87 requires a relatively small force for actuation, so that film 21 will not be damaged or dislodged from the guide rods 54 and 55 as they are engaged by the actuator rod.

The processing station

Having considered operational and structural features of the film pick-up apparatus contained in section 13, it will be further appreciated that the processing section 13 comprises essentially the entire fluid system for the apparatus, with the exception of sump tank 114. In general, and with particular reference to FIGURES 3 and 4, processing section 13 includes a tank assembly for storing required chemical fluids, means for maintaining fluids in the tank assembly at predetermined elevated temperatures, means for metering required amounts of fluids from the tank assembly into the film processing chamber at the film processing station, means for dumping fluids from the processing chamber after use, means for preventing the intermixing of different fluids at their inlet openings to the processing chamber, and means for filling and draining the storage tank assembly.

The storage tank assembly (FIGURE 4) comprises a welded stainless steel tank 33 provided with three compartments 33a, 33b and 33c. The two side compartments 33a and 33c. The two side compartments 33a and 33c store equal quantities of developer and fix chemicals, respectively, whereas the center compartment 33b stores a quantity of wash water. Proper temperature of the chemicals is maintained by a thermostat 90 (FIGURE 3) mounted in a recessed area at the center of the tank assembly and operable to control energization of an electric heater 93 positioned in heat exchange relation with the lower surface of the tank assembly.

Fill tubes 34 and drain-cocks 42 are located toward one end of each of the tank structures as shown in FIGURE 3, and the filter tube caps are constructed and arranged to achieve tank venting upon loosening the caps. For the sake of convenience, only one each of the fill tubes and drain-cocks is illustrated.

The processing chamber and valve assembly 35 is located adjacent the other end of the storage tank assembly, and includes a valve block 94 sandwiched between respective upper and lower plates 95 and 96 interconnected by tie-rods (not shown) that extend through valve block 94. Upper valve plate 95 is secured to the bottom of the storage tank assembly 32 and derives its support therefrom.

Three separate but identical valve systems (one is shown) are provided within valve block 94 to meter gravitational flow of each of the processing fluids to chamber 92, selectively, from each of the compartments 33a, 33b and 33c. Each valve system includes a vertically movable shuttle spool 97 mounted within a metering chamber 98 formed within valve block 94. A pair of ring-type seals 99 are mounted on each spool 97, and are positioned and arranged to seal against generally conical surfaces disposed in the upper and lower portions of the metering chambers, selectively, depending on the position of the spool.

Each valve spool 97 is normally held in its lower position by means of a compression spring 100 reacting between an outer portion of valve block 94 and a washer provided on the spool. In this normal position of the spool, fluid may enter metering chamber 98 through holes 91 in the top valve plate 95. Air is vented through tube 101 above the surface of the fluid in the tank. The metering chamber 98 is filled and, the vent tube 101 is filled to the level of fluid in the tank. Fluid is prevented from flowing from metering chamber 98 by sealing engagement of the lower sealing ring 99 with the conical surface in valve block 94.

Each of a push type solenoid 104 is energizable to force a valve-spool 97 upwardly by means of an armature pin 105 abuttingly engaging the valve-spool stem. The upper sealing ring 99 on each valve spool 97 then seals against an upper conical surface, closing off holes 91 in upper valve plate 95, and preventing fluid from entering the metering chamber from the tank assembly.

As the lower sealing ring 99 is raised, the lower region of the metering chamber is opened and fluid flows outwardly through passage 106, nozzle 107, into air lock chamber 108, thence into chamber 92 where the fluid level is raised to cover the film 21. Solenoid 104 need be energized only long enough for chamber 92 to fill, and when this solenoid is de-energized the valve spool is returned by spring 100 to its lower position sealing off passage 106 and opening holes 91 in the plate so that metering chamber 98 may again fill in preparation for the next cycle. A sealing ring 109 is provided to prevent leakage of fluid past the valve stem.

When the valve spool 97 is in its upper position, flow of fluid from metering chamber 98 is halted when the head of fluid developed in the processing chamber 92 becomes equal to the head of fluid remaining in the metering chamber and in passage 106. This arrangement will ensure metering of fluid into processing chamber 92 in amount sufficient only to cover the film. The cross-sectional area of nozzle 107 is of such dimension that when valve spool 97 is returned to its lower sealing position, fluid will remain in passage 106. If the nozzle area were too large, for example larger than ¼ inch in diameter, there would be a tendency for an air bubble to flow up the tube and cause fluid to flow from the nozzle. The diameter of nozzle 107 preferably is approximately ³⁄₁₆ inch, and is sufficiently small to prevent entrance of an air bubble as hereinabove described. Of course, exact diameters depend, in general, on such factors as fluid viscosity, wetting agents, surface finish and the like.

Air-lock chamber 108 isolates incoming chemicals from one another as they enter the processing chamber, by preventing intermingling of chemicals in the chamber with chemicals in the inlet passages.

Variations in the amounts of fluid available to drain from metering chamber 98, due to fluid contained in the vent tube 101 and varying in correspondence to the level of fluid in the tank, has an insignificant effect on the aforementioned heads of fluids, because the volume of the tube is too small appreciably to change both fluid levels.

A solenoid operated door 110 is provided across the bottom of processing chamber 92, and is operable to dump spent fluids rapidly therefrom into a sub-chamber 111. Fluids drain from sub-chamber 111 into the main sump tank 114 through a connecting plastic tube 115. An elongated orifice 116 in combination with tube 115 provides venting of sub-chamber 111. Orifice 116 is necessary because the top of the processing chamber 92 is sealed by gasket 43 on arm 41a, when tree 40 is in its lower position (broken lines, FIGURE 3), preventing the overflow passage 117 from serving as a vent. Sump tank 114 comprises such vent and drain means as are required, which means are not shown, inasmuch as they are not required for an understanding of the present invention.

While the processing chamber assembly 35 has been fully described in connection with the present invention, it is not claimed per se, since it comprises the claimed subject matter of the copending application of William O. Nix, Ser. No. 569,895, filed August 3, 1966, and assigned to the assignee of the present invention.

*The drying and extractor station*

As best seen in FIGURES 3, 5, and 11, drying station 36 includes a drying chamber 120, a centrifugal blower 118, and an electric heater 119. Centrifugal blower 118, in combination with electric heater 119, is operable to supply hot air for the drying chamber 120. Air is drawn into the blower through an aperture 129 provided with a filter 130, and the resultant hot air is carried from the blower and heater to chamber 120 by means of a flexible conduit 121. Chamber 120 comprises a vertical, generally wedge-shaped section 128 narrowing at the bottom. The film is inserted by tree 40 into the wedge shaped region a sufficient distance to seat gasket 43 for sealing the top of chamber 128, and hot air is fed into the upper region of chamber 128, thence forced downwardly past the film 21 held by rods 54, 55. Due to the wedge shape of the drying chamber, velocity of the air increases as it moves downwardly, reaching a maximum toward the bottom of the film, where the rapidly flowing air is effective to removed drops of water which tend to accumulate along the bottom edge of the film. The spent drying air then flows from the sump section 14 through suitably provided grill means (not shown).

Still with reference to FIGURES 5 and 11, the film is removed from the tree at drying station 36. For this purpose, solenoid 122 is energizable to move a pin 123 over the upper edge of film 21, so that as tree 40 moves upwardly, as illustrated in FIGURE 11, the film is stripped by pin 123 downwardly from guide rods 54, 55. As illustrated in FIGURE 10, the film then drops by gravity from the bottom of the chamber, through chute 124, and into container 44 for subsequent removal by the operator. A deflector 126 operable by solenoid 127 is normally positioned over container 44 (FIGURE 5) so that when a film is drying, the finished films in container 44 are protected from air and drops of water discharged from the drying chamber. When the film is released to fall from the drying chamber, solenoid 127 is energized to pivot deflector 126 to the position shown in FIGURE 10 to allow free fall of the film into container 44.

Summarizing, tree structure 40 is operable to move upwardly and downwardly, and to rotate clockwise (as viewed in FIGURE 4) in 120° increments while in its upper position. Pick-up, processing, and drying of a film chip 21 are effected while tree 40 is in its lower position, shown in dotted lines in FIGURES 3, 5 and 6. Construction and arrangement of tree 40 is such that while in the lower position it engages a film 21 clamped between arms 73, 74 of the pick-up station 72. Tree 40 then is raised, is rotated 120°, and is moved downwardly, inserting the film 21 into the processing chamber 35 (FIGURE 3) where the film is treated by the application of chemicals. Following chemical treatment of the film, tree 40 again is raised, is rotated 120°, and is moved downwardly, inserting film 21 into the drying station 36 (FIGURE 5), where it is dried by warm air flowing from a combination blower-heater 118, 119. Upon being dried, film 21 is stripped from tree 40 as it is moved upwardly (FIGURE 11). The dried film, upon being stripped, falls through a slot 124 (FIGURE 10) in the region of drying station 36, and into box 44 in the sump section 14, for removal by an operator of the apparatus.

The transport mechanism

Considering the transport mechanism in more detail, tree 40 has three radially extending, equally angularly spaced arms 41, in order that after a second film has been picked up by the tree for processing, film will be positioned simultaneously in each of the pick-up 72, the processing 35, and the drying stations 36. Tree 40 is supported on a shaft 46 which is journalled in base plate 29 so that it can be driven rotatably, in either a forward or a reverse sense, by a reversible motor 47 through a pulley and drive belt arrangement 48 (FIGURE 5) also supported on plate 29. A reciprocating device 49, which may be of the type known as a Roh'lix actuator manufactured by the Barry Controls Corporation, is mounted on the shaft 46 and operates to move tree 40 up and down, and to rotate it about shaft 46 as previously described.

Actuator 49 operates in a manner similar to the traveling nut on a lead-screw, except that frictional contact of ball bearings on the smooth hard shaft 46 is substituted for a threaded connection. The general arrangement is best seen in FIGURE 3, where the actuator appears as a generally rectangular box with shaft 46 extending along the major axis. Actuator 49 comprises two generally box-shaped halves 50 spring-loaded toward one another about the shaft 46. Each half 50 carries four small ball bearings 51 which are so disposed at an angle with respect to shaft 46 that the outer races thereof roll in a helical path along the shaft as it is rotated by motor 47 (FIGURES 4 and 5) relative to the actuator. This causes actuator 49 to translate axially along shaft 46 in one direction or the other, according to the direction of relative rotation between the actuator and the shaft. Forces developed between the bearings 51 and shaft 46 are a function of the spring loading applied to the halves 50, the bearings 51 being free to slip on shaft 46. Extensive slippage can be accommodated without damage because the surface of shaft 46 is relatively smooth and solid.

If the actuator is prevented from moving along shaft 46 as it rotates, a reaction torque is developed tending to rotate the actuator about the shaft. This torque is proportional to the amount of spring loading. Thus, by use of this actuator, both upward and downward motion, as well as rotation, may be imparted to tree 40 through bi-directional rotation of shaft 46 by reversible motor 47.

Tree 40 is prevented from rotating, except at or very near its upper position, by guide rods 54 and 55 which extend into close fitting slots 56 disposed in portions of the processing and drying sections. In the upper position of tree 40, rods 54 and 55 are clear the top ends of the slots 56 and allow the tree to rotate. To facilitate rotation of tree 40, a ball-trust bearing 57 is positioned on top plate 58 and abuttingly engages the tree when it moves to its upper position (FIGURES 3 and 5). Reaction torque exerted by rotating shaft 46 through bearings 51 then causes tree 40 to rotate, sina its linear motion along the shaft has been halted by the thrust bearing.

With reference to FIGURES 7 and 8, a latch assembly 59 is positioned and operable to halt tree 40 in the correct position after it has been raised and rotated 120°, so that the tree again may be moved downwardly, inserting guide rods 54 and 55, and films 21 into the appropriate stations. Latch assembly 59 is mounted on the horizontal plate 58, and extends through an aperture 60 therein so that the assembly may intercept an arm 41 of tree 40 as it rotates beneath the plate. For convenience, showing of latch assembly 59 has been omitted from FIGURES 3 and 6 where it would otherwise appear.

The tree arm 41 becomes locked between ends of latch arms 63 and 64, at which time drive motor 47 is reversed in a manner later described, and tree 40 is driven downwardly to the position indicated by broken lines in FIGURE 3. Latch arms 63 and 64 prevent further rotation of tree 40, and serve to guide the tree as it first moves downwardly, until guide-rods 54 and 55 have engaged slots 56 in the chamber 35.

Considering the latch assembly 59 in more detail, and as best seen in FIGURE 8, latch arms 63 and 64 are mounted in housing 69, arm 64 being pivoted about fixed pin 66 while arm 63 is pivotal about pin 65 riding in slot 67. Both arms are spring loaded downwardly in the position shown, and arm 63 also is spring loaded horizontally to the right hand position shown. Arms 63 and 64 further include respective pins 80 and 81 slidable within slots 80a and 81a, respectively. As one of the tree arms 41 is rotated to a position under the latch 59, as indicated by directional arrow in FIGURE 8, it just clears the bottom of housing 69 and slidably engages arm 64, pivoting it upwardly about pin 66, in a camming action. As arm 41 continues to rotate, it abuttingly engages the vertical face of arm 63 pushing it substantially along its length, to the left (see broken line showing of arm 63), so as to compress spring 68. Arm 64 (full line showing) then pivots downwardly as arm 41 moves from beneath its edge, and tree arm 41 is then disposed and held between the latch arms 63 and 64. As the tree arm 41 is moved downwardly, upon reversal of the motor, latch arm 63 moves to the right (full line showing), returning to its rest position. Upon return of tree 40 to its upper position, the next tree arm 41 engages the bottom of latch arm 63, forcing it upwardly, in repetition of the latch action just described. Each time the guide rods 54 and 55 move clear of the tops of slots 56, upon movement of tree 40 to its upper limit of travel, the next tree arm 41 is acted upon by the latch in the same manner. Limit switch 71 is disposed and adapted (FIGURES 3, 7 and 9) to engage tree arm 41, 41a to sense that tree 40 is in its raised position, is rotatably indexed, and is ready to move downwardly. This switch therefore conditions the control means to energize motor 47 for rotation in the opposite direction, whereby to move tree 40 to its lower position.

Advantageously, the film loading or pick-up, film developing, and film drying stations are disposed in a generally circular array about a central axis. This circular disposition of the several basic elements of the film processor accommodates the combination therewith of a film transport mechanism comprising a rotatable actuator shaft that extends along the axis of symmetry of the station array.

From the foregoing description, it will be appreciated that the invention affords a complete, automatic, dental X-ray film processor, which starts with an exposed X-ray film package and delivers a dry, processed negative. The processor is therefore self contained, and is characterized by a high degree of portability. It will be understood, of course, that modifications may be made in the illustrated embodiment of the invention without departing from the scope of the appended claims.

We claim:

1. In unitary apparatus for developing film of the type including means defining a film loading station, means defining a film developing station, means defining a film drying station, and rotatable means operable to receive a film at said loading station, and to feed said film sequentially thereafter, in incremental angular movements, to said developing station and to said drying station, said rotatable means comprising: a plurality of angularly spaced, radially outwardly presented arms each having a transversely extending portion spaced substantially the same distance from the center of rotation; a pair of substantially parallel spaced rods presented unidirectionally from each of said transversely extending arm portions, said rods having longitudinally grooves presented toward one another, said film being slidably received in said grooves for transport by said arms; and resiliently actuated clamping means carried by said transversely extending arm portions operable releasably to retain a film received in said grooves.

2. Apparatus according to claim 1, and further characterized in that said film loading station comprises a pair of film clamping members pivotal between a film receiving position and a position in which said film is held for alignment with said grooves in said rods, said radially presented arms being movable toward said loading station to engage said film held by said clamping members and movable away from said loading station to transport said film.

3. Apparatus according to claim 1 and further characterized in that said film drying station comprises: a chamber into which a film carried by said rods is insertable upon movement of one of said arms toward the drying station, said chamber being of a generally wedge shape, open at both its wider and at its narrower sections, said film being insertable into the wider open section in substantial alignment with the center of said chamber; and means for introducing heated air into the wider open section of said chamber, for flow over said film, and for discharge through the narrower open section.

4. In unitary apparatus for developing film, the combination comprising: means defining a film loading station; means defining a film developing station; means defining a film drying station; rotatable means operable to receive a film at said loading station, and to feed said film sequentially thereafter, in incremental angular movements, to said developing station and to said drying station, said rotatable means comprising a plurality of angularly spaced, radially extending arms arranged simultaneously to receive a film and to present a film at each of said recited stations for each step in the recited sequence of operations, said rotatable means further being movable vertically toward and away from said stations upon each angular movement; reversible motor means for driving said rotatable means; and releasable latch means operable to accommodate vertical movement of said rotatable means while preventing rotation of the latter upon rotation of the motor in one direction and further operable to accommodate rotational movement of said rotatable means upon rotation of the motor in the other direction.

5. Apparatus according to claim 4, and further characterized in that said releasable latch means comprises: guide rod means spaced from and extending parallel to the axis of rotation of said rotatable means and slidably receivable in apparatus means provided at each of said stations upon vertical movement of said rotatable means toward a station; and a pair of levers in spaced end-to-end relation so positioned that the space therebetween is in substantial registry with one of said arms when said guide rod means is aligned with said aperture means, said levers being pivotally mounted at their extreme end portions, one of said levers further being slidable in the direction of rotation of said arm, the other of said levers being slidably engageable by said arm upon rotational movement of said arm into such space and the other of said arms thereupon being abuttingly engaged and displaced laterally, whereby said arm is locked against further rotation.

6. In unitary apparatus for developing film, means defining a film loading station, means defining a film drying station including a chamber, and rotatable means operable to receive a film at said loading station, and to feed said film sequentially thereafter, in incremental angular movements, to said developing station and to said drying station, said rotatable means comprising a plurality of angularly spaced, radially outwardly presented arms each having a pair of spaced rods extending transversely of the arms and having longitudinal grooves presented toward one another, said film being slidably received in said grooves for transport by said arms, and resilient clamping means operable releasably to retain a film received in said grooves, film carried by said rods being insertable in said drying chamber upon movement of one of said arms toward the drying station.

7. Apparatus according to claim 6 and further characterized by the provision of means for stripping said film from said rods, comprising reciprocably mounted pin means movable from a retracted rest position into a projected operational position in which it is engaged by a free edge of said film as said rotatable means is moved upwardly, whereby said film is stripped from said grooves and presented for removal from said drying station.

8. Apparatus according to claim 6, and characterized further by the inclusion of: means for stripping said film from said rods, including reciprocably mounted pin means movable from a retracted rest position into a projected operational position in which it is engaged by a free edge of said film as said rotatable means is moved upwardly, whereby said film is stripped from said groove and presented and for removal from said drying station; receptacle means for receiving a film gravitationally from said drying station as it is stripped from said grooves; and deflector means positioned intermediate said drying station and said receptacle and normally positioned so as to deflect droplets of fluid falling from said film as it is dried to prevent the fluid from falling into the receptacle, said deflector means further being pivotal to a second position in which it is moved out of the path of the film as it is stirpped and falls into said receptacle.

9. In apparatus for developing film, means defining film loading, film developing, and film drying stations, said stations being disposed in a generally circular array about a central axis, and film transport means rotatable about said axis, said rotatable transport means being operable to receive a film at said loading station, and to feed said film thereafter, in incremental angular movements, sequentially to said developing station and to said drying station, said rotatable means further being movable axially, toward and away from said stations upon each incremental angular movement to provide for dwell periods in each said station, said rotatable means further comprising a plurality of angularly spaced, radially extending arms supported upon central shaft means extending along said axis, each said arm being constructed and arranged to receive and to carry a film, said apparatus being further characterized in thta said film loading station comprises a pair of film clamping members pivotal between a film receiving position and a position in which said film is held for alignment with one of said radially extending arms, said arms being movable axially toward said loading station to engage a film held for alignment with one of said arms.

10. In film developing apparatus of the type including film loading, film developing, and film drying stations disposed in generally circular array about a central axis, film transport means rotatable about said axis and operable to receive a film at said loading station and to feed said film thereafter, in incremental angular movements, sequentially to said developing station and to said drying station, said rotatable means further being movable axially, toward and away from said stations upon each increment angular movement to provide for dwell periods in each station, said rotatable means comprising: a plurality of angular spaced, radially extending arms each including a pair of spaced rod-like elements extending transversely of said arms and having longitudinal grooves facing one another for slidably receiving film to be transported, and means effecting resilient, releasable retention of said film in said grooves.

11. Apparatus according to claim 10 and further characterized by the inclusion of means for stripping said film from said rods, comprising reciprocably mounted pin means movable from a retracted rest position into a projected operational position in which it is engaged by a free edge of said film as said rotatable means is moved away from said stations, whereby said film is stripped from said rods and presented for removal from said drying station.

References Cited

UNITED STATES PATENTS

| | | | |
|---|---|---|---|
| 2,380,378 | 7/1945 | Allen | 95—14 |
| 2,916,976 | 12/1959 | Applegate et al. | 95—89 X |
| 2,927,521 | 3/1960 | Smith | 95—93 |

NORTON ANSHER, *Primary Examiner.*

CHARLES E. SMITH, *Assistant Examiner.*

U.S. Cl. XR.

95—14, 94